(12) United States Patent
Qiu et al.

(10) Patent No.: US 11,892,293 B1
(45) Date of Patent: Feb. 6, 2024

(54) PLATFORM GAUGE INSTRUMENT AND PLATFORM GAUGE MEASURING METHOD BASED ON PHOTOGRAMMETRIC PRINCIPLE

(71) Applicant: NINGBO SPECIAL EQUIPMENT INSPECTION AND RESEARCH INSTITUTE, Ningbo (CN)

(72) Inventors: Faju Qiu, Ningbo (CN); Wei Chen, Ningbo (CN); Jijie Yang, Ningbo (CN); Xiangning Kuang, Ningbo (CN); Gaoyao Ding, Ningbo (CN); Yiyi Zhang, Ningbo (CN); Jianer Wang, Ningbo (CN); Jinhui Yang, Ningbo (CN)

(73) Assignee: NINGBO SPECIAL EQUIPMENT INSPECTION AND RESEARCH INSTITUTE, Ningbo (CN)

( * ) Notice: Subject to any disclaimer, the term of this patent is extended or adjusted under 35 U.S.C. 154(b) by 0 days.

(21) Appl. No.: 18/198,291

(22) Filed: May 17, 2023

(30) Foreign Application Priority Data

Jul. 28, 2022 (CN) .......................... 202210895040.1

(51) Int. Cl.
*G01C 25/00* (2006.01)
*G01C 11/02* (2006.01)
(Continued)

(52) U.S. Cl.
CPC ............ *G01C 11/025* (2013.01); *G01C 25/00* (2013.01); *G06T 7/80* (2017.01); *H04N 23/90* (2023.01); *G06T 2207/30244* (2013.01)

(58) Field of Classification Search
CPC ............ B64U 2101/30; B64U 2201/10; B64U 10/13; B64U 2201/20; B64U 2101/00;
(Continued)

(56) References Cited

U.S. PATENT DOCUMENTS

2021/0136350 A1* 5/2021 Zweigle ................. H04N 23/90
2021/0373167 A1* 12/2021 Buback ..................... G06T 7/50

FOREIGN PATENT DOCUMENTS

| CN | 201707034 U | 1/2011 |
| CN | 103075976 A | 5/2013 |

(Continued)

*Primary Examiner* — Masum Billah
(74) *Attorney, Agent, or Firm* — Bayramoglu Law Offices LLC

(57) ABSTRACT

A platform gauge instrument and a platform gauge measuring method based on a photogrammetric principle are provided. According to the platform gauge instrument, measuring stations are arranged on both sides of a platform, and the measuring stations on both sides work together to ensure the acquisition of complete platform information. The measuring stations have automatic traveling capability to complete scanning of a whole platform, platform information obtained by the scanning is automatically resolved by a measuring system, and gauge dimensions such as a transverse dimension and a vertical dimension of a platform gauge are resolved through parameters such as object-space coordinates of platform edge points, a space equation of intersection lines of upper surfaces of rails and a measuring cross-section, and common tangent lines of the upper surfaces of two rails on the measuring cross-section, so that resident and real-time gauge high-precision detection of the platform is achieved.

4 Claims, 3 Drawing Sheets

(51) Int. Cl.
*G06T 7/80* (2017.01)
*H04N 23/90* (2023.01)

(58) Field of Classification Search
CPC .... B64U 2101/60; B64U 30/20; B64U 50/19; B64U 2201/104; B64U 10/10
USPC ........................................................ 348/139
See application file for complete search history.

(56) References Cited

FOREIGN PATENT DOCUMENTS

| | | | | |
|---|---|---|---|---|
| CN | 107585222 A | | 1/2018 | |
| CN | 108086239 A | * | 5/2018 | ............... E01H 8/10 |
| CN | 112857328 A | * | 5/2021 | ............. G01C 11/08 |
| CN | 112857328 A | | 5/2021 | |
| CN | 113009456 A | * | 6/2021 | |
| CN | 113009456 A | | 6/2021 | |
| CN | 113776462 A | | 12/2021 | |
| JP | 2016114568 A | | 6/2016 | |

* cited by examiner

PLATFORM GAUGE INSTRUMENT AND PLATFORM GAUGE MEASURING METHOD BASED ON PHOTOGRAMMETRIC PRINCIPLE

CROSS REFERENCE TO THE RELATED APPLICATIONS

This application is based upon and claims priority to Chinese Patent Application No. 202210895040.1, filed on Jul. 28, 2022, the entire contents of which are incorporated herein by reference.

TECHNICAL FIELD

The present invention relates to the technical field of railway platform gauge detection, and in particular to a platform gauge instrument and a platform gauge measuring method based on a photogrammetric principle.

BACKGROUND

Railway platform, as an important facility for trains to stop, will experience different degrees of settlement and displacement during operation, resulting in different degrees of deformation of the platform, which leads to the phenomenon of platform intrusion. When platform intrusion occurs, accidents such as scraping and rubbing of trains are easily caused, potential safety hazards are brought to passengers and trains, and normal traffic order is influenced. Therefore, railway departments require dynamic management of platform gauge. According to relevant provisions of Railway Technical Management Regulations, railway housing units shall enhance management and detection of building gauge of housing (construction) buildings, wherein gauge detection is performed no less than once a quarter, and measurement shall be performed at any time when gauge changes (such as construction, platform deformation and settlement) are influenced.

At present, the platform gauge measurement work is mainly performed through contact gauge equipment for gauge detection, that is, the conventional ruler-type measuring tools such as a platform gauge ruler are used for measurement. This measuring method needs to be performed in a skylight point at night, normal vehicle scheduling is influenced, and the vehicle density at night is difficult to improve; and the operating personnel is easy to fatigue during a night operation, and the operation efficiency is low; the measurement operation process is complex, the measurement precision is closely related to the technical level of a measurer, and the measurement has personal errors; the labor cost for measurement is high, and the potential safety hazard exists for operating personnel. With the rapid development of railways in China, railway departments have paid more attention to the refined management of platforms, and the drawbacks of traditional gauge measurement are difficult to ignore.

SUMMARY

In order to overcome the defects of the affected vehicle scheduling, unsatisfactory measurement accuracy, high labor costs and low work efficiency in the conventional gauge measurement, the present invention provides a platform gauge instrument and a platform gauge measuring method based on a photogrammetric principle, wherein measuring stations are arranged on both sides of the platform and cooperate with each other to obtain complete platform information. The measuring stations have automatic traveling capability to complete scanning of a whole platform, platform information obtained by the scanning is automatically resolved by a measuring system, and gauge dimensions such as a transverse dimension and a vertical dimension of a platform gauge are resolved through parameters such as object-space coordinates of platform edge points, a space equation of intersection lines of upper surfaces of rails and a measuring cross-section, and common tangent lines of the upper surfaces of two rails on the measuring cross-section, so that resident and real-time gauge high-precision detection of the platform is achieved.

In order to achieve the above objective, the present invention adopts the following technical solutions:

The present invention discloses a platform gauge instrument based on a photogrammetric principle, which includes: two measuring stations, namely a first measuring station and a second measuring station, wherein the first measuring station and the second measuring station are symmetrically arranged on both sides of a rail, the measuring station includes a traveling mechanism, a stabilizing cradle head and a measuring pod, an outside of the measuring pod includes a waterproof outer cover and a waterproof window, and a laser line projector, a binocular navigation camera and a binocular measuring camera are arranged in the measuring pod.

Optionally, the traveling mechanism is connected with the measuring pod by the stabilizing cradle head.

The present invention further discloses a platform gauge measuring method based on a photogrammetric principle, which includes the following steps:

mutually positioning a binocular measuring camera on the first measuring station and a binocular measuring camera on the second measuring station with unified coordinate systems;

calibrating a focal length and an external orientation element of the binocular measuring camera on the first measuring station in a calibration field, photographing the binocular measuring camera on the second measuring station by the binocular measuring camera on the first measuring station, and measuring an external orientation element of the binocular measuring camera on the second measuring station and a corresponding station-moving key point; and after completing the calibration in the calibration field, adding a scene to be measured into the measuring station, photographing rails by the second binocular measuring camera, photographing the binocular measuring camera on the second measuring station by the binocular measuring camera on the first measuring station, and completing the calculation of the external orientation element of the binocular measuring camera on the second measuring station by re-measuring each positioning key point of the binocular measuring camera on the second measuring station in combination with a station-moving algorithm.

Optionally, the method further includes: projecting textures on non-textured rails by the laser line projector, wherein the textures include, but are not limited to plaques and stripes.

Optionally, the method further includes: performing real-time positioning on the platform gauge instrument by the first measuring station and the second measuring station with a control point preset on a platform ground.

Optionally, the method further includes: realizing synchronous movement of the traveling mechanism of the first measuring station and the traveling mechanism of the second measuring station by the traveling mechanisms with visual navigation.

According to the technical scheme described above, compared with the prior art, the present invention provides a platform gauge instrument and a platform gauge measuring method based on a photogrammetric principle, wherein the platform gauge instrument based on the photogrammetric principle adopts the mutual positioning of the measuring stations at two sides to achieve the unification of coordinate systems, the direct resolving and measuring of external orientation elements of a camera is achieved without depending on a field control point, and the purpose of platform gauge measurement is completed. With the adoption of texture mapping technology, the defect that point cloud information obtained by a conventional laser measuring method is incomplete is overcome, and the difficulty that a high-precision curve is difficult to fit due to the fact that part of signal points are lost because the surface of rails is smooth is overcome; and the curve feature points are captured by adopting the photogrammetric principle, high-precision fitting is completed, and the measuring precision is improved. The platform gauge instrument based on the photogrammetric principle can be positioned in real time by means of the control points preset on the platform ground, and a user can conveniently master the motion direction of instrument in real time. In conclusion, the present invention has a high automation degree, a simple and convenient operation and a high measurement precision, and can achieve resident and real-time high-precision detection of the platform gauge instrument on the platform.

BRIEF DESCRIPTION OF THE DRAWINGS

In order to more clearly illustrate the technical schemes in the examples of the present invention or in the prior art, the drawings required to be used in the description of the examples or the prior art are briefly introduced below. It is obvious that the drawings in the description below are merely examples of the present invention, and those of ordinary skilled in the art can obtain other drawings according to the drawings provided without creative efforts.

Figure 1:
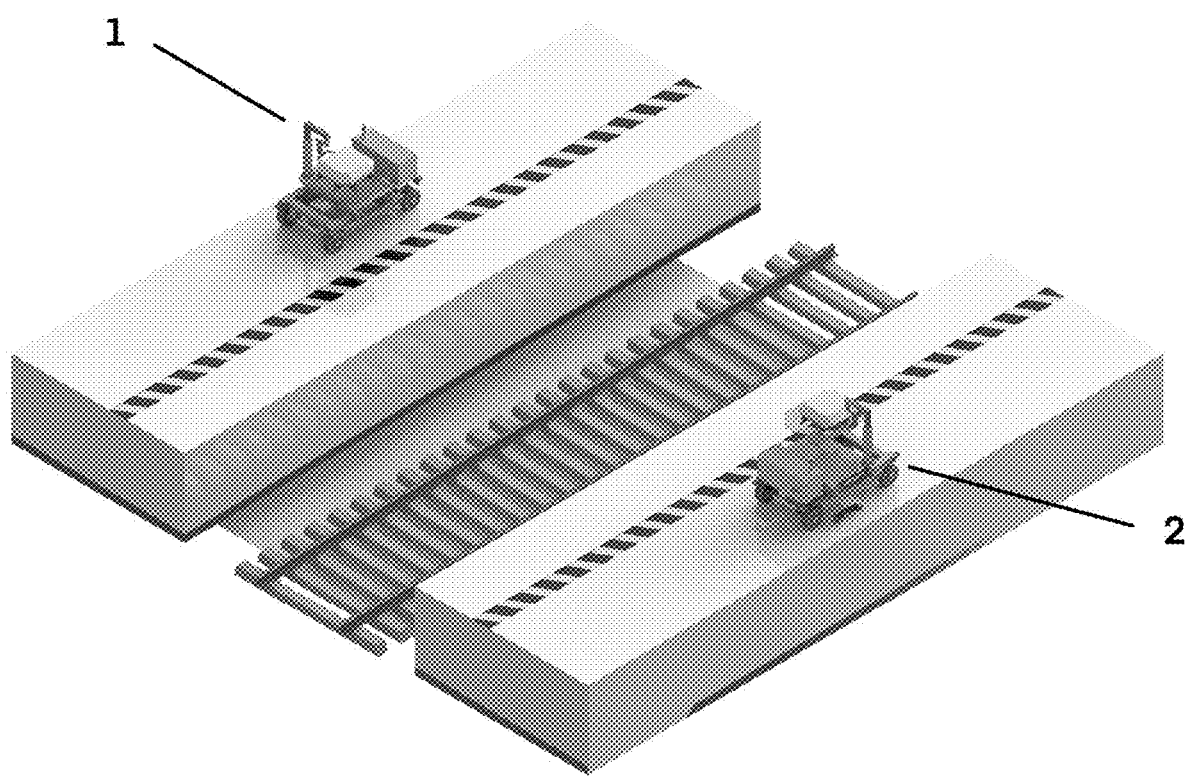
FIG. 1 is a schematic diagram of the field layout of a platform gauge instrument.

In the drawings, 1. first measuring station, 2. second measuring station, 3. traveling mechanism, 4. stabilizing cradle head, 5. measuring pod, 6. waterproof outer cover, 7. waterproof window, 8. first laser line projector, 9. first navigation camera eye, 10. second navigation camera eye, 11. first measuring camera eye, 12. second measuring camera eye and 13. second laser line projector.

DETAILED DESCRIPTION OF THE EMBODIMENTS

The technical schemes in the embodiments of the present invention will be clearly and completely described below with reference to the drawings in the embodiments of the present invention, and it is obvious that the described embodiments are only a part of the embodiments of the present invention but not all of them. Based on the examples of the present invention, all other examples obtained by those of ordinary skilled in the art without creative efforts shall fall within the protection scope of the present invention.

Figure 2:
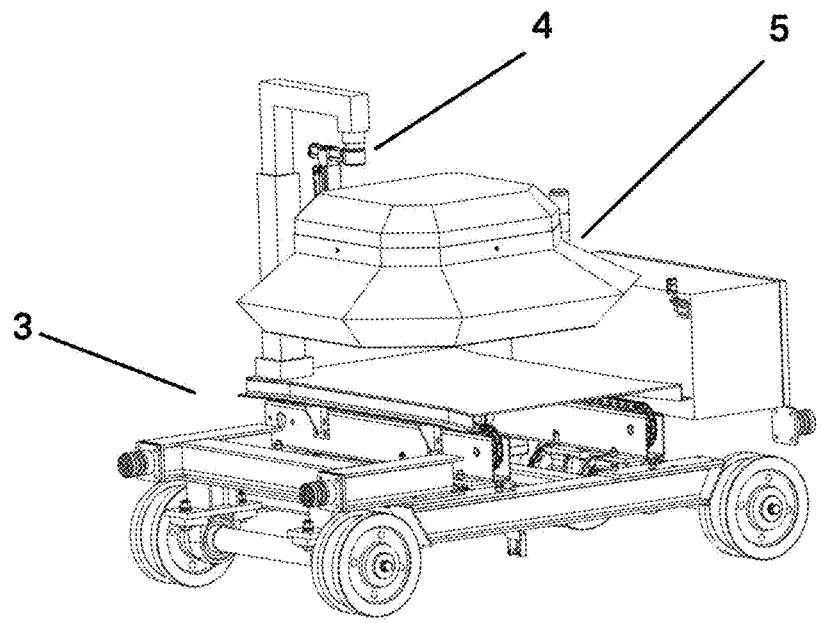
FIG. 2 is a schematic diagram of measuring stations.
Figure 3:
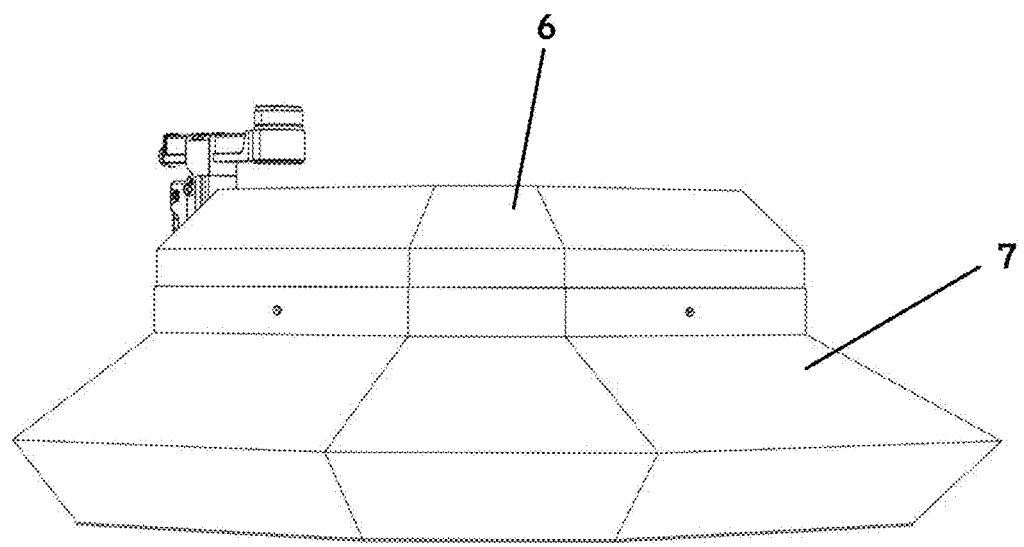
FIG. 3 is a schematic diagram of a measuring pod.
Figure 4:
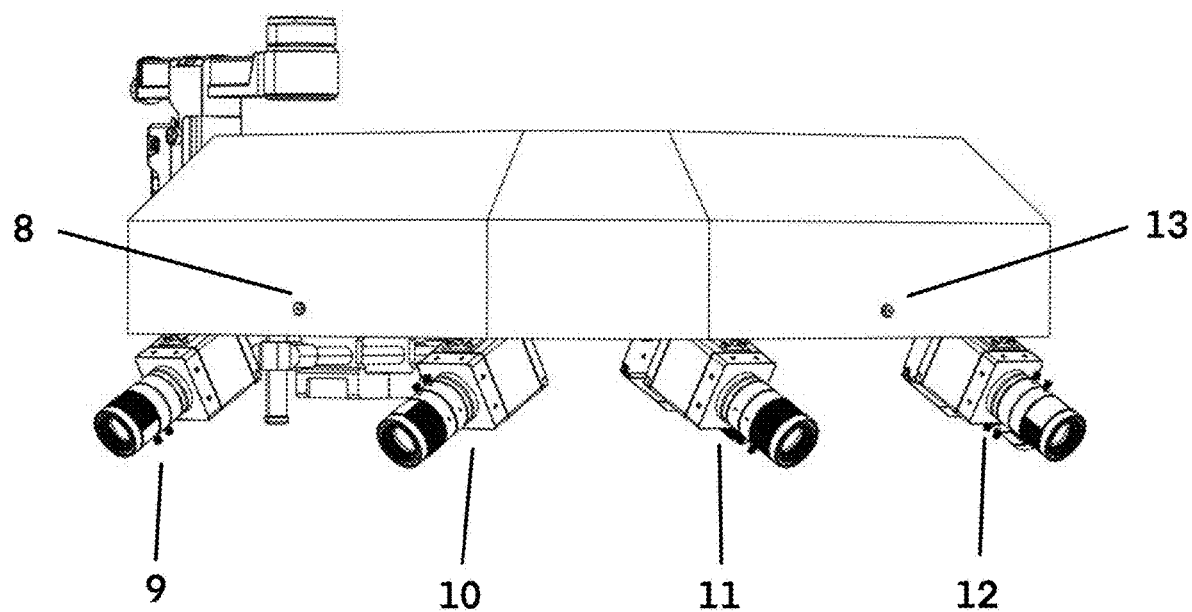
FIG. 4 is a schematic diagram of a measuring pod with a waterproof window removed.

An embodiment of the present invention discloses a platform gauge instrument based on a photogrammetric principle, as shown in FIGS. 1-4, which includes: measuring stations including a first measuring station 1 and a second measuring station 2. The first measuring station 1 and the second measuring station 2 are identical devices. The components in the measuring stations are specifically arranged as follows: a traveling mechanism 3 is provided, a stabilizing cradle head 4 is arranged on the traveling mechanism 3, a measuring pod 5 is mounted on the stabilizing cradle head, a first navigation camera eye 9, a second navigation camera eye 10, a first laser line projector 8, a second laser line projector 13, a first measuring camera eye 11 and a second measuring camera eye 12 are arranged in the measuring pod.

Specifically, the traveling mechanism adopts a visual navigation method, and the first measuring station 1 and the second measuring station 2 move synchronously; the binocular navigation camera is arranged in the measuring pod 5 and is configured to select a routing and location area for the traveling mechanism; and the first laser line projector 8 or the second laser line projector 13 projects textures onto the non-textured rails within the measurement area.

Specifically, the binocular measuring cameras at two side is pre-calibrated in a calibration field, a platform gauge instrument based on the photogrammetric principle is placed in the calibration field for calibration, the calibration field consists of a frame consisting of a plurality of supporting columns and calibration blocks arranged on the supporting columns, the calibration blocks are designed by taking a three-coordinate light-pen measuring instrument produced by METRONOR A.S. as a preset calibration measuring tool, and four blind holes with the same diameter as a diameter of a ruby head of the light-pen measuring instrument and the same depth as a radius of the ruby head of the light-pen measuring instrument are symmetrically distributed on a front surface of each calibration block.

An embodiment of the present invention further discloses a platform gauge measuring method based on a photogrammetric principle, which includes the following steps:

mutually positioning a binocular measuring camera on the first measuring station 1 and a binocular measuring camera on the second measuring station 2 with unified coordinate systems;

calibrating a focal length and an external orientation element of the binocular measuring camera on the first measuring station 1 in a calibration field, photographing the binocular measuring camera on the second measuring station 2 by the binocular measuring camera on the first measuring station 1, and measuring an external orientation element of the binocular measuring camera on the second measuring station 2 and a corresponding station-moving key point; and after completing the calibration in the calibration field, adding a scene to be measured into the measuring station, photographing rails by the second binocular measuring camera, photographing the binocular measuring camera on the second measuring station 2 by the binocular measuring camera on the first measuring station 1, and completing the calculation of the external orientation element of the binocular measuring camera on the second measuring station 2 by re-measuring each positioning key point of the binocular measuring camera on the second measuring station 2 in combination with a station-moving algorithm.

In this embodiment, the method further includes: projecting textures on non-textured rails by the laser line projector, wherein the textures include, but are not limited to plaques and stripes; performing real-time positioning on the platform gauge instrument by the first measuring station 1 and the second measuring station 2 with a control point preset on a platform ground; and realizing synchronous movement of the traveling mechanism of the first measuring station 1 and the traveling mechanism of the second measuring station 2 by the traveling mechanisms with visual navigation.

In another embodiment, the platform gauge instrument based on the photogrammetric principle is placed in a calibration field, and the object-space coordinates of a surface center point of a calibration block can be obtained by measuring the position of a hole. In the image plane coordinate system, because a periphery of the calibration block has definite circumferential feature points, the image plane coordinates of the calibration block are obtained by selecting four corner points of the calibration block and an average value is obtained, and the coordinates of the surface center of the calibration block can also be obtained by calculation. An integral coordinate system based on a calibration field is established, and the calibration field is separated after realizing the calibration of external orientation elements of the binocular measuring camera of the first measuring station 1 and the calibration of one external orientation element and the corresponding positioning key point of the binocular measuring camera of the second measuring station 2. The platform gauge instrument based on the photogrammetric principle is placed on both sides of a platform, the binocular measuring camera of the second measuring station 2 is adjusted to photograph rails in a measuring area at a proper distance and at a proper angle, the object-space coordinates of the station-moving key point of the binocular measuring camera of the second measuring station 2 are re-measured by the binocular measuring camera of the first measuring station 1, the moving calculation of the external orientation elements of the binocular measuring camera of the second measuring station 2 is achieved, and the platform gauge measurement is completed.

The basic principle of the station-moving algorithm is as follows:

the station-moving algorithm obtains a rotation matrix R and a translation matrix S through singular value decomposition operation based on object-space coordinates of each point in a point system forming a rigid body with a coordinate system, so that after a parameter matrix P of each point in an original coordinate system and the station-moving operation are performed, a parameter matrix Q of each point meets the relation:

$$Q = R \cdot P + S$$

The station-moving algorithm has advantages as follows.

In the conventional close-range photogrammetric method, the acquisition of the external orientation elements depends on a rear intersection operation based on a control point system, so that the acquisition of the external orientation elements of the multi-view measuring system cannot get rid of the dependence on the control point system.

After the vision measuring system is established based on the station-moving algorithm, the multi-view measuring system can get rid of a control point system, and high-precision measurement is achieved on the engineering site according to internal parameters.

The embodiments in the specification are all described in a progressive manner, and each embodiment focuses on differences from other embodiments, and portions that are the same and similar between the embodiments may be referred to each other. Since the device disclosed in the embodiment corresponds to the method disclosed in the embodiment, the description is relatively simple, and reference may be made to the partial description of the method.

The above description of the disclosed embodiments enables those skilled in the art to implement or use the present invention. Various modifications to these embodiments will be readily apparent to those skilled in the art, and the general principles defined herein may be applied to other embodiments without departing from the spirit or scope of the present invention. Thus, the present invention is not intended to be limited to these embodiments shown herein but is to accord with the broadest scope consistent with the principles and novel features disclosed herein.

What is claimed is:

1. A platform gauge measuring method based on a photogrammetric principle, comprising:

arranging two measuring stations, namely a first measuring station and a second measuring station, wherein the first measuring station and the second measuring station are symmetrically arranged on both sides of a rail, the measuring station comprises a traveling mechanism, a stabilizing cradle head and a measuring pod, an outside of the measuring pod comprises a waterproof outer cover and a waterproof window, a laser line projector, a binocular navigation camera and a binocular measuring camera are arranged in the measuring pod, and the traveling mechanism is connected with the measuring pod by the stabilizing cradle head;

mutually positioning a binocular measuring camera on the first measuring station and a binocular measuring camera on the second measuring station with unified coordinate systems;

calibrating a focal length and an external orientation element of the binocular measuring camera on the first measuring station in a calibration field, photographing the binocular measuring camera on the second measuring station by the binocular measuring camera on the first measuring station, and measuring an external orientation element of the binocular measuring camera on the second measuring station and a corresponding station-moving key point; and after completing the calibration in the calibration field, adding a scene to be measured into the measuring station, photographing rails by the second binocular measuring camera, photographing the binocular measuring camera on the second measuring station by the binocular measuring camera on the first measuring station, and completing the calculation of the external orientation element of the binocular measuring camera on the second measuring station by re-measuring each positioning key point of the binocular measuring camera on the second measuring station in combination with a station-moving algorithm; wherein the station-moving algorithm obtains a rotation matrix R and a translation matrix S through singular value decomposition operation based on object-space coordinates of each point in a point system forming a rigid body with a coordinate system, so that after a parameter matrix P of each point in an original coordinate system and the station-moving operation are performed, a parameter matrix Q of each point meets the relation:

$$Q = R \cdot P + S; \text{ and}$$

the measuring station has automatic traveling capability to complete scanning of a whole platform, and platform information obtained by the scanning is automatically resolved by a measuring system, and a platform gauge dimension is resolved through object-space coordinates of platform edge points, a space equation of intersection lines of upper surfaces of rails and a measuring cross-section, and a parameter of the upper surfaces of two rails on the measuring cross-section, so that high-precision detection of the platform is achieved.

2. The platform gauge measuring method based on the photogrammetric principle according to claim 1, further comprising:

projecting textures on non-textured rails by the laser line projector, wherein the textures comprise, but are not limited to plaques and stripes.

3. The platform gauge measuring method based on the photogrammetric principle according to claim 1, further comprising:

performing real-time positioning on the platform gauge instrument by the first measuring station and the second measuring station with a control point preset on a platform ground.

4. The platform gauge measuring method based on the photogrammetric principle according to claim 3, further comprising:

realizing synchronous movement of the traveling mechanism of the first measuring station and the traveling mechanism of the second measuring station by the traveling mechanisms with visual navigation.

* * * * *